United States Patent [19]

Yoshimura et al.

[11] Patent Number: 4,914,158

[45] Date of Patent: Apr. 3, 1990

[54] GRANULAR POWDER OF MELT PROCESSABLE FLUORINE-CONTAINING RESIN AND PREPARATION OF THE SAME

[75] Inventors: Tatsushiro Yoshimura, Takatsuki; Takeshi Suzuki, Nagaokakyo; Shuhei Shimasaki, Yono; Masashi Watada, Settsu, all of Japan

[73] Assignee: Daikin Industries, Ltd., Osaka, Japan

[21] Appl. No.: 201,295

[22] Filed: May 27, 1988

Related U.S. Application Data

[63] Continuation-in-part of Ser. No. 35,804, Apr. 8, 1987, abandoned.

[30] Foreign Application Priority Data

Apr. 11, 1986 [JP] Japan .................................. 61-84722

[51] Int. Cl.$^4$ .............................................. C08L 27/12
[52] U.S. Cl. ...................................... 525/199; 525/200; 428/402
[58] Field of Search ................. 525/199, 200; 428/402

[56] References Cited

U.S. PATENT DOCUMENTS

| | | | |
|---|---|---|---|
| 3,265,679 | 8/1966 | Black et al. | 260/92.1 |
| 3,484,503 | 12/1969 | Magner et al. | 525/199 |
| 3,527,857 | 9/1970 | Fitz | 264/117 |
| 3,981,852 | 9/1976 | Manwiller et al. | 526/250 |
| 3,981,853 | 9/1976 | Manwiller | 526/255 |
| 4,029,870 | 6/1977 | Brown et al. | 525/199 |
| 4,069,291 | 1/1978 | Kidoh et al. | 524/425 |
| 4,216,265 | 8/1980 | Sulzbach | 428/402 |
| 4,241,137 | 12/1980 | Izumo et al. | 428/402 |
| 4,248,763 | 2/1981 | Yoshimura et al. | 260/42.22 |
| 4,276,214 | 6/1981 | Yoshimura et al. | 260/45.75 |
| 4,368,296 | 1/1983 | Kuhls et al. | 525/266 |
| 4,370,436 | 1/1983 | Nakamura et al. | 524/322 |
| 4,379,900 | 4/1983 | Sulzbach | 526/247 |
| 4,408,007 | 10/1983 | Kuhls et al. | 526/247 |
| 4,665,113 | 5/1987 | Eberl | 524/440 |
| 4,675,380 | 6/1987 | Buckmaster et al. | 525/326.2 |
| 4,687,708 | 8/1987 | Batzar | 428/339 |

FOREIGN PATENT DOCUMENTS 1100388 1/1968 United Kingdom .

*Primary Examiner*—George F. Lesmes
*Assistant Examiner*—Christopher Brown
*Attorney, Agent, or Firm*—Armstrong, Nikaido, Marmelstein, Kubovcik & Murray

[57] ABSTRACT

The granular powder of a melt processable fluorine-containing resin which is an agglomerate comprising particles of the melt processable fluorine-containing resin having an average particle size of not more than 200 μm and a tetrafluoroethylene polymer as a binder is described. The agglomerate has an average particle size of not more than 1000 μm and a bulk density of not less than 0.3 g/cm$^3$. The granular powder has an excellent flowability, crushing resistance and processability as materials for powder coating and roto-molding of powder.

2 Claims, 2 Drawing Sheets

GRANULAR POWDER OF MELT PROCESSABLE FLUORINE-CONTAINING RESIN AND PREPARATION OF THE SAME

This application is a continuation-in-part of application Ser. No. 035,804 filed Apr. 8, 1987, now abandoned.

BACKGROUND OF THE INVENTION

The present invention relates to a granular powder of melt processable fluorine-containing resin which is suitable as materials for powder coating and roto-molding of powder, and a process for preparing the granular powder.

Fluorine-containing resin powders which are used for powder coating by means of spray coating method, electrostatic spray coating method, fluidized bed coating method or electrostatic fluidized bed coating method and roto-molding or roto-lining are required to have excellent processabilities such as flowability, crushing resistance and film forming property.

In order to give those powder properties to polytetrafluoroethylene (hereinafter referred to as "PTFE") powder, a PTFE primary powder is agglomerated to form a granular powder by utilizing interaction aggregating force between the PTFE particles (U.S. Pat. No. 3,265,679, British Pat. No. 1,100,388, U.S. Pat. No. 3,527,857, U.S. Pat. No. 4,241,137).

However since a melt processable fluorine-containing resin (hereinafter referred to as "MPFR") powder has a lower interaction aggregating force than that of PTFE powder, there could not be employed the above processes for the PTFE powder. Therefore powders of the MPFR for powder coating or the like are prepared according to a process in which a fine powder of the MPFR or its dispersion is thermally treated through spraying it into a high temperature atmosphere (Japanese Tokkyo Kokoku No. 44576/1977), or a process in which a MPFR pellet prepared by a melt extrusion is pulverized.

The former spray drying process, however, is less economical due to requirement of large thermal energy. Also the latter pulverizing process cannot provide a powder product with stable powder properties because powder properties such as particle shape, size and bulk density of the powder product are hardly regulated due to difficulty of control of the pulverization.

As a result of the present inventors' intensive study for providing a MPFR granular powder having stable powder properties, it has been found the fact that an agglomerate of the MPFR particles in which a tetrafluoroethylene polymer (hereinafter referred to as "TFE polymer") is present as a binder has excellent and stable powder properties, and can be prepared by a process similar to the PTFE granular powder preparation processes which have not been applicable to preparation of a MPFR granular powder.

SUMMARY OF THE INVENTION

According to the present invention, there can be provided a granular powder of a melt processable fluorine-containing resin which is at least one member selected from the group consisting of a tetrafluoroethylene copolymer containing tetrafluoroethylene in an amount of not more than 97% by weight, a chlorotrifluoroethylene polymer and a vinylidene fluoride polymer, and is an agglomerate, comprising particles of the melt processable fluorine-containing resin having an average particle size of not more than 200 $\mu$m and a tetrafluoroethylene polymer as a binder, said agglomerate has an average particle size of not more than 1000 $\mu$m and a bulk density of not less than 0.3 g/cm$^3$, and said tetrafluoroethylene polymer as a binder is at least one member selected from the group consisting of a tetrafluoroethylene homopolymer and a tetrafluoroethylene polymer modified by copolymerizing a tetrafluoroethylene with at least one monomer, in an amount of 0.001 to 2% by mole, selected from the group consisting of perfluoro alkyl vinyl ether, hexafluoropropylene, chlorotrifluoroethylene and vinylidene fluoride, and a weight ratio of the melt processable fluorine-containing resin to the tetrafluoroethylene polymer as a binder is 99.5/0.5 to 90.9/9.1.

DETAILED DESCRIPTION

As described above, since the MPFR powder particles are poor in mutual aggregating force, even if the MPFR particles form an agglomerate the MPFR agglomerate is inferior in crushing resistance, and thus is easily crushed to loose into the starting powder particles. When the TFE polymer is present between the MPFR particle as a binder, however, the obtained agglomerate turns to possess an extremely improved crushing resistance and improved flowability and bulk density and can provide a granular powder of stable powder properties. In addition a film forming property of the MPFR granular powder is improved.

Though the reason why the TFE polymer gives the above effects has not yet been clear, it seems that a shearing stress acts on the binder polymer at the agglomeration to make fibriles on the binder polymer.

The granular powder of the present invention is prepared by using TFE polymer particles as a binder, as described hereinafter. After the agglomeration, however, the binder is not necessarily particle, and may have fibrous or amorphous shape.

Examples of the MPFR are, for instance, perfluoroalkoxy resins such as tetrafluoroethylene (TFE)-perfluoro alkyl vinyl ether (FVE) copolymer in which the number of carbon atoms in perfluoro alkyl vinyl ether is 1 to 5 and TFE-hexafluoropropylene(HFP)-FVE copolymer; perfluoroalkylene resins such as TFE-HFP copolymer; tetrafluoroethylene copolymers such as TFE-ethylene copolymer and TFE-ethylene-propylene copolymer; chlorotrifluoroethylene (CTFE) polymers such as CTFE homopolymer and CTFE-ethylene copolymer; vinylidene fluoride (VdF) polymers such as VdF homopolymer, VdF-TFE copolymer and VdF-hexafluoroisobutene (FHIB) copolymer. In the case of the TFE copolymer, an amount of the TFE monomer is not more than 97%, preferably 80 to 97%, particularly 85 to 97% by weight.

The average particle size of the starting MPFR particle is not more than 200 $\mu$m, particularly 0.05 to 200 $\mu$m. When the particle size is more than 200 $\mu$m the obtained granular particle is inferior in crushing resistance. Shapes of the MPFR particle may be either fibrous or non-fibrous.

The MPFR powder particle used in the present invention may be a powdered particle of a coarse particle prepared by suspension polymerization or a colloidal particle or so-called fine powder prepared by emulsion polymerization.

The TFE polymers used as a binder are, for example, TFE homopolymer (PTFE), a modified PTFE prepared by modifying PTFE with a copolymerizable monomer other than TFE, or the like. Examples of the monomer copolymerizable with TFE modified PTFE are, for instance, FVE, HFP, CTFE, VdF and two or more kinds thereof. The amount of the monomer copolymerizable with TFE other than TFE in the modified PTFE is 0.001 to 2% by mole, preferably 0.002 to 1% by mole. The TFE polymer may be used alone or in an admixture thereof, and may be a polymer prepared by either suspension polymerization or emulsion polymerization. The TFE polymer is generally added in a form of powder or colloidal aqueous dispersion. The particle size is not particularly restricted, but is preferably about 0.05 to 800 $\mu$m, especially 0.1 to 50 $\mu$m in view of handling and miscibility with the MPFR particle.

The granular powder of the present invention may contain a thermal stabilizer. As the thermal stabilizer there can be employed, for instance, at least one member selected from the group consisting of an amine antioxidant, an organosulfurous compound and an organotin antioxidant; at least one member selected from metal powders of tin and zinc; a mixture of a metal powder of Group VIII of the Periodic Table, an amine antioxidant and an organosulfurous compound; a mixture of an organosulfurous compound and a powder of tin or zinc; a mixture of one or more kinds of phenolic antioxidants and at least one member selected from the group consisting of an organosulfurous compound and an organotin antioxidant; a mixture of a carbon black powder, an organosulfurous compound and an amine antioxidant, or in addition at least one member selected from fine powders of zinc, tin, cobalt, nickel and iron; a mixture of one or more kinds of metallic soaps and at least one member selected from the group consisting of an amine antioxidant and an organosulfurous compound; and the like (U.S. Pat. No. 4,276,214 and U.S. Pat. No. 4,248,763) Examples of the thermal stabilizer are, for instance, zinc salt of 2-mercaptobenzoimidazole, zinc salt of 2-mercaptbenzothiazole, phenyl-$\beta$-naphthylamine, dibutyl-tin-mercaptide, tin powder, 2,2'-methylene-bis(4-methyl-6-tert-butylphenol), cobalt naphthenate, zinc salt of 2-benzothiazole, 4,4'-bis-($\alpha,\alpha'$-dimethylbenzyl)diphenylamine, lead stearate, di-$\beta$-naphthyl-p-phenylenediamine, cobalt powder, carbon black and a mixture thereof.

Other additives such as inorganic or organic filler material may be blended in the MPFR granular powder of the present invention.

The MPFR granular powder of the present invention is an agglomerate of the MPFR particles containing the TFE polymer as a binder. The granular powder particle has an average particle size of not more than 1000 $\mu$m, preferably not more than 800 $\mu$m, and a bulk density of not less than 0,3 g/cm$^3$, preferably not less than 0.35 g/cm$^3$. A granular powder particle having an average particle size of more than 1000 $\mu$m is inferior in adhesive property to a substrate. A lower limit of the particle size varies on kinds of MPFR and particle sizes of the used MPFR particle, but is generally not less than 20 $\mu$m, preferably not less than 30 $\mu$m in view of flowability. The granular powder particle must comprise at least two MPFR particles because the granular powder particle is an agglomerate. When the granular powder particle has a bulk density of less than 0.3 g/cm$^3$, a film produced from the granular powder tends to contain voids therein after sintering.

A ratio of the MPFR and the TFE polymer as a binder in the granular powder varies on kinds and particle sizes of MPFR and binder, but a ratio of MPFR/TFE polymer is preferably 99.9/0.1 to 90.9/9.1. When a percentage of the TFE polymer as binder becomes large, a bulk density of the granular powder particle tends to be lowered due to the influence of fibrization, and thus a film forming property becomes bad. When the thermal stabilizer is incorporated, its content is preferably not more than 10% of the MPFR.

The MPFR granular powder can be prepared by modifying the processes for agglomeration of PTFE granular powder. The processes are explained hereinbelow.

A first process is a process in which a MPFR powder having an average particle size of not more than 200 $\mu$m and a TFE polymer as a binder are agitated in water in the presence of an organic liquid which is insoluble or difficult to dissolve in water and has a boiling point of 30° to 150° C. and a surface tension (measured at 25° C., hereinafter the same) of not more than 35 dynes/cm at a temperature of 20° C., and then dried.

An object of the presence of the organic liquid is to wet the MPFR particle surface and the TFE polymer particle surface for aggregating the particles with each other. The presence of the organic liquid is the essential matter for forming stable aggregation state in a large amount of water, because the MPFR and TFE polymer have poor wettability to water.

An organic liquid having the above properties is an organic liquid having a boiling point of 30° to 150° C., preferably 30° to 100° C. and a surface tension of not more than 35 dynes/cm. The higher the boiling point of the organic liquid, the more the hardness (crushing resistance) of the obtained granular powder particles increased. However when an organic liquid having a boiling point of more than 150° C., a cost for installation becomes large and also workability in production steps becomes remarkably bad. When using an organic liquid having a boiling point of less than 30° C., the particles form an incomplete agglomerate which is easily crushed under a weak external force, and thus the incomplete agglomerate cannot possess a resistance to vibration during transportation. Further the larger the surface tension of the organic liquid, the lower the wettability for the MPFR, and as a result, effects of agglomeration are lowered. Therefore it is not preferable to use an organic liquid having a surface tension of more than 35 dynes/cm.

Examples of the organic liquid which can be used for the process of the present invention are, for instance, aliphatic hydrocarbons such as hexane, heptane, gasoline, kerosene and a mixture thereof; aromatic hydrocarbons such as benzene, toluene and xylene; ethers such as anisole and tetrahydrofuran; halogenated hydrocarbons such as trichloroethylene, tetrachloromethane, allyl iodide, dibromoethylene, chloral, dichloroacetic acid, monochlorobenze and benzyl chloride; fluorine-containing compounds such as trichlorotrifluoroethane, monofluorotrichloromethane, difluorotetrachloroethane, octafluorocyclobutane, compounds having the formulas of $Cl(CF_2CFCl)_nCl$, $H(CF_2CF_2)_nCH_2OH$ and $Cl(CF_2CFCl)_nCl$ wherein n is an integer of 1 to 5, ω-monohydroperfluorohexene, benzotrifluoride, monobenzotrifluoride, dibromotetrafluoroethane, trichloropentafluoropropane and a mixture thereof.

The MPFR powder having an average particle size of not more than 200 μm can be prepared according to conventional processes. For example, there may be employed (1) a process in which a MPFR coarse powder prepared by suspension polymerization is crushed with a crusher such as ultramizer, micron mill, sample mill or jet o'mizer (Japanese Tokkyo Kokoku No. 22619/1969), (2) a process in which a colloidal aqueous dispersion of MPFR prepared by emulsion polymerization is subject to spray drying (Japanese Tokkyo Kokoku No. 44576/1977).

The process (1) can generally provide a powder having an average particle size of 10 to 200 μm, and the process (2) can provide a so-called "fine powder" having an average particle size of 0.05 to 200 μm. The TFE polymer added as a binder may be a powder having an average particle size of 0.05 to 800 μm which are prepared according to the processes (1) and (2) or may be a colloidal aqueous dispersion prepared by emulsion polymerization.

A mixing order or mixing method of the MPFR powder, the TFE polymer, the organic liquid, water and if necessary, the thermal stabilizer is not particularly limited. In view of powder properties, preferred embodiments are explained hereinbelow.

(A) The MPFR powder is added to a large amount of water and agitated. To the mixture the TFE polymer powder or its aqueous dispersion and the organic liquid are added under agitation to perform agglomeration. While continuing the agitation, the resulting agglomerate is divided to the desired granular particles, and then filtered and dried.

The mixing order of the MPFR powder and the TFE polymer may be vice versa. Further the organic liquid may be added before the addition of the second powder. Moreover the agitation may be carried out after addition of all components.

(B) The MPFR powder is added to a large amount of water and agitated. To the mixture the colloidal aqueous dispersion of the TFE polymer prepared by emulsion polymerization and the organic liquid are added under agitation to perform agglomeration. The resulting agglomerate is treated in the same manner as in the process (A).

The mixing order of the MPFR powder, the colloidal aqueous dispersion of the TFE polymer and the organic polymer may be changed.

(C) The MPFR powder, the organic liquid and the TFE polymer powder or its aqueous dispertion or the colloidal aqueous dispersion of TFE polymer by emulsion polymerization are previously mixed. After adding the mixture to a large amount of water and agitating, the same treatment of the process (A) is repeated.

The amount of water is preferably 4 to 50 times larger than a total weight of the powders and the organic liquid. Use of such a large amount of water is preferable, because a hydraulic pressure is applied to the agglomerates which are dispersed in water and can assist aggregation of the powder particles in the agglomerates.

With respect to the mixing ratio of the MPFR powder and the TFE polymer powder, the TFE polymer is generally used 0.1 to 10 PHR (parts by weight to 100 parts by weight, hereinafter the same) to the MPFR, which corresponds to MPFR/TFE polymer=99.9/0.1 to 90.9/9.1.

Since the organic liquid is used to wet the particle surfaces of the MPFR powder and the TFE polymer powder, the organic liquid is used in such an amount that the particle surface can be completely wetted. Generally the amount of the organic liquid is about 10 to 300 PHR, preferably 20 to 200 PHR to a total amount of the MPFR and the TFE polymer.

In case of using the thermal stabilizer, it is preferable to mix with the MPFR powder. The amount of the stabilizer is about 0.05 to 10 PHR, preferably about 0.1 to 5 PHR to the MPFR.

The agitation in water can be carried out by optionally selecting an agitator and a rotation speed so as to obtain a granular powder having a desired particle size and particle size distribution. As the agitator there can be employed an agitator equiped with propeller type blade, flat blade turbine, 45 pitched flat blade turbine, or pitched or non-pitched curved blade, a screw-type agitator, and a comb-type agitator.

The rotation number employed at the mixing of each component and at the agglomeration (finely dividing) may be the same or different. Generally it is preferred to rotate at a peripheral speed of 0.5 to 40 m/sec.

A water temperature at the agitation is preferably selected within a range from about 20° to 150° C. When employing about 100° to 150° C., the agitation should be carried out under pressure. When a water temperature is kept below a boiling point of the organic liquid, the agglomerate is recovered after agitation and then the organic liquid and water are removed by drying. Further when the mixing of the components is at first carried out at a water temperature below a boiling point of the organic liquid and after that the agitation is carried out by gradually elevating the water temperature to a temperature above the boiling point of the organic liquid, recovering can be easily achieved because the agglomerate is floated due to evaporation of the organic liquid.

The agglomerate dispersed in water can be recovered by filtration or decantation. The drying is carried out generally at a temperature from about 100° C. to a melting point of the MPFR by using an infra-red drying equipment or an electric furnace until the organic liquid and water are removed.

A second process of preparation of the MPFR granular powder is a process in which the TFE polymer particle is added to a colloidal aqueous dispersion of the MPFR particle prepared by emulsion polymerization and having an average particle size of 0.05 to 3 μm, and the mixture is agitated in the presence or absence of an organic liquid which is insoluble or difficult to dissolve in water and has a boiling point of 30° to 150° C. and a surface tension of not more than 35 dynes/cm, and then dried.

The feature of this process is to use, as the MPFR component, a colloidal aqueous dispersion prepared by emulsion polymerization as it is or by diluting the dispersion without isolation. The TFE polymer is added in a form of powder, aqueous dispersion thereof or colloidal aqueous dispersion prepared by emulsion polymerization. In view of dispersibility, it is preferably employed the colloidal aqueous dispersion of the latter.

The TFE polymer usable in the first process can be used, and also the organic liquid usable in the first process can be used. Though the organic liquid may be added at the same time or before or after the addition of the TFE polymer, it is prefered to add at the same time or after the addition of the TFE polymer in view of dispersibility. In addition, a thermal stabilizer may be added. As the other conditions such as agitation, treating temperature and treating time there can be employed those in the first process.

In case of absence of the organic liquid, the process can be achieved according to a similar process for preparing a so-called PTFE or modified PTFE fine powder, that is a process in which a MPFR colloidal aqueous dispersion having a MPFR concentration adjusted to approximate 5 to 20% is agitated in the presence of the TFE binder to give aggregating ability.

According to this process, the preparation steps can be shortened because the agglomeration step can be followed directly after the emulsion polymerization step of the MPFR.

A third process is a process in which a mechanical force is applied to a powder mixture of the MPFR powder having an average particle size of not more than 200 μm and the TFE polymer powder under wetting condition with a liquid wetting agent, and the wet powder mixture is tumbled, and then the wetting agent is evaporated during or after the tumbling treatment.

The MPFR powder and the TFE polymer powder usable in the first process can be used in this process. In addition a thermal stabilizer and/or a filler material may be added.

As the wetting agent for wetting the MPFR powder and the TFE polymer powder, there can be used an organic liquid having a boiling point of 30° to 150° C. and a surface tension of not more than 35 dynes/cm. The organic liquid may be the organic liquid which is insoluble or difficult to dissolve in water as used in the first process, or a water-soluble organic liquid. Examples of the water-soluble organic liquid are, for instance, alcohols such as ethyl alcohol, methyl alcohol, isopropanol, t-butyl alcohol, allyl alcohol, ethylene glycol and cyclohexanol; aldehydes such as para-aldehyde, acetal and acrolein; ketones such as acetone, cyclohexanone and methyl ethyl ketone; and the like. These organic liquids may be used together with water.

The wetting agent is used for making a mixing state of the MPFR powder and the TFE polymer powder to a slurry-like mixing state capable of tumbling. The wetting agent is used in such an amount as to produce the above slurry-like mixing state, e.g. about 10 to 300 PHR, preferably about 20 to 200 PHR to a total amount of the MPFR and the TFE polymer.

The feature of this third process which is different from the first process is that the prepared slurry-like mixture is not agitated in a large amount of water, but is tumbled as it is and, during or after the tumbling treatment, the wetting agent is evaporated therefrom. The tumbling treatment is carried out at a temperature of about 0° to 150° C. under pressure or reduced pressure or an atmospheric pressure, provided that the final temperature should be elevated to or above a boiling point of the wetting agent. Preferably, the tumbling treatment starts at a temperature lower than a boiling point of the wetting agent, and then the tumbling temperature is gradually elevated to a temperature of not less than the boiling point.

The tumbling of the wet powder mixture can be carried out by using a mixer such as a V-type blender, C-type blender or a combination of the blenders. Also a fluidized mixer can be employed. Further there can be advantageously employed a process in which by applying an air flow upward to the wet mixture placed on a sieve, the wet mixture is finely divided and simultaneously tumbled, or a process in which the wet mixture is tumbled on a dished container or a disk which is rotating.

According to the third process, a cost for treating a large amount of the drain can be advantageously reduced.

The MPFR granular powder of the present invention prepared by those processes has an average particle size of not more than 1000 μm and a bulk density of not less than 0.3 g/cm$^3$. In the granular particle the MPFR primary particles are properly bonded via the TFE polymer. The granular powder has an excellent powder flowability, crushing resistance and processability, and is suitable as materials for powder coating, roto-molding of powder, and the like.

The present invention is more specifically described and explained by means of the following Examples. It is to be understood that the present invention is not limited to the Examples, and various changes and modifications may be made in the invention without departing from the spirit and scope thereof.

EXAMPLE 1

As the MPFR powder was employed a finely divided tetrafluoroethylene-perfluoro (propyl vinyl ether) copolymer (PFA) prepared by suspension polymerization having a melt index (MI) of 5.6 g/10 min, TFE content of 96.4% by weight and an average particle size of 10.5 μm, and was treated according to the following steps to obtain a granular powder of the present invention.

A 2 l container of SUS was charged with 1 l of distilled water of 20° C., and 100 g of the PFA powder was added thereto. The mixture was agitated by using a three-one motor equipped with turbo blades (available from SHINTO KAGAKU KABUSHIKI KAISHA) at a rotation speed of 3,500 r.p.m., and then a finely divided PTFE prepared by suspension polymerization (Polyflon M-12 having an average particle size of 25 μm: available from Daikin Kogyo Co., Ltd.) was added with agitation in the amount shown in Table 1. After agitating for 5 minutes, 140 ml of trichlorotrifluoroethane (b.p.: 47.6° C., surface tension (25° C.): 18 dynes/cm) was added and the agitation was continued for another 3 minutes. As a result of the particles in the aqueous dispersion began to agglomerate. At this time the temperature of the dispersion was regulated to a temperature shown in Table 1, and the rotation speed was lowered to 600 r.p.m. After agitating for 5 minutes, the agglomerate was recovered by filtration with a 100 mesh sieve, and dried by using an infra-red light drying equipment for 30 minutes, and then in an electric furnace of 150° C. for 16 hours to obtain a MPFR granular powder. The obtained granular powder had an average particle size, a bulk density, a flowability and a crushing resistance as shown in Table 1.

A frame (80 mm × 80 mm × 2 mm) was placed on an aluminum plat, and the granular powder was placed in the frame. After removing the frame the granular powder was sintered at 350° C. for 20 minutes to give a sheet-like molded article. The appearance of the formed film was observed with naked eyes, and judged according to the following criteria. The results are shown in Table 1.
 : A continuous sheet
 Δ: Having some recesses on a local portion
 : Having pores and forming non-continuous film The melt index (MI) and average particle size of the starting powder, and the average particle size, bulk density, flowability and crushing resistance of the resulting MPFR granular powder were measured according to the following methods.

MI of Starting Powder
Measured according to the method of ASTM D 2116.

Average Particle Size of Starting Powder
A sample powder is added to an aqueous solution of Nonion HS-208 (nonionic surfactant available from Nippon Oil and Fats Co., Ltd.) having a concentration of 2 g/500 ml.H₂O, and the mixture is subjected to ultrasonic vibration for 1 minute to disperse the sample powder. The resulting dispersion is introduced to a Centrifugal Automatic Particle Analyzer (CAPA-500 available from HORIBA, LTD.), and the average particle size of the particles in the dispersion is determined.

Average Particle Size of Granular Powder
Standard sieves of JIS are set in a Tyler Ro-Tap sieve shaker (available from IIDA SEISAKUSHO), and 50 g of a sample is placed in the shaker and shaken for 5 minutes to classify, and an average particle size and particle size distribution are determined.

Bulk Density of Granular Power
Measured according to the method of JIS K 6891 5.3.

Flowability of Granular Powder
Flowability is evaluated on the basis of angle of repose. The angle of repose is measured by gently flowing down a sample powder through a funnel (top inside diameter: 40 mm, bottom inside diameter: 6 mm, height: 40 mm) with an orifice (inside diameter: 6 mm, length: 3 mm) at the exit. The powder is accumulated on floor until the top of the accumulated powder reaches the exit of the funnel. A radical r(mm) of the base of the conically accumulated powder is measured. An angle of repose was calculated according to the following equation.

$$\text{Angle of Repose } \theta = \tan^{-1}\left(\frac{2\theta}{\theta}\right)$$

It should be noted for measuring the angle of repose that humidity and static electricity of a sample powder must be previously and sufficiently removed.

Crushing Resistance of Granular Powder
A hopper with a stopper (top opening diameter: 80 mm, bottom opening diameter: 20 mm, height: 100 mm) is set so that the bottom of the hopper is positioned at 120 mm height. By releasing the stopper a sample powder filled in the hopper falls down. A crushing state of the fallen powder is observed with naked eyes, and judged according to the following criteria.
 : Fallen granular particle is not broken.
 Δ: Fallen granular particle is broken.
 : Fallen granular particle is finely crushed.

TABLE 1

| Experiment No. | Amount of PTFE powder* (PHR) | Agglomeration temperature (°C.) | Ave. particle size (μm) | Bulk Density (g/cm³) | Angle of repose (degree) | Crushing resistance | Film forming property |
|---|---|---|---|---|---|---|---|
| 1 | — | 20 | — | 0.46 | 37 | Δ | X |
| 2 | — | 40 | 610 | 0.54 | 37 | O | X |
| 3 | 1 | 40 | 660 | 0.56 | 34 | O | Δ |
| 4 | 5 | 40 | 710 | 0.58 | 36 | O | O |
| 5 | 10 | 40 | 670 | 0.61 | 33 | O | O |

*Parts by weight to 100 parts by weight of PFA powder (hereinafter the same)

EXAMPLE 2
A PFA granular powder was prepared in the same manner as in Example 1 except that an aqueous dispersion of PTFE prepared by emulsion polymerization (solid content: 21%, average particle size: 0.25 μm, molecular weight: about 3,500,000) was added in an amount shown in Table 2 as the TFE polymer. Properties of the resulting granular powder are shown in Table 2. Also a film forming property of a sheet prepared by using the granular powder is shown in Table 2.

TABLE 2

| Experiment No. | Amount of PTFE powder (PHR) | Agglomeration temperature (°C.) | Ave. particle size (μm) | Bulk Density (g/cm³) | Angle of repose (degree) | Crushing resistance | Film forming property |
|---|---|---|---|---|---|---|---|
| 1 | — | 20 | — | 0.46 | 37 | Δ | X |
| 2 | — | 40 | 610 | 0.54 | 37 | O | X |
| 6 | 1 | 40 | 660 | 0.57 | 35 | O | O |
| 7 | 5 | 40 | 710 | 0.59 | 33 | O | O |
| 8 | 10 | 40 | 670 | 0.63 | 33 | O | O |

EXAMPLE 3
A tetrafluoroethylene-hexafluoropropylene (88/12 by weight) copolymer (FEP) granular powder was prepared in the same manner as in Example 2 except that a finely devided FEP prepared by suspension polymerization (melt viscosity (MV): $6.7 \times 10^4$ poise, average particle size: 10.5 μm) was used as the MPFR powder and the conditions shown in Table 3 were employed. Properties of the granular powder are shown in Table 3. A film forming property of a sheet prepared by using the granular powder is also shown in Table 3.

The melt viscosity of the FFP powder was measured by using a Koka Flow Tester (available from SHIMADZU CORPORATION) under the following conditions: nozzle (diameter: 2 mm φ, length: 8 mm), temperature (380° C.±2° C.), dead weight (7 kg).

TABLE 3

| Experiment No. | Amount of PTFE powder (PHR) | Agglomeration temperature (°C.) | Properties FEP granular powder | | | |
|---|---|---|---|---|---|---|
| | | | Ave. particle size (μm) | Bulk Density (g/cm³) | Crushing resistance | Film forming property |
| 9 | — | 20 | — | 0.64 | X | O |
| 10 | — | 40 | — | 0.64 | X | O |
| 11 | 1 | 20 | 650 | 0.65 | Δ | O |
| 12 | 5 | 20 | 650 | 0.67 | O | O |
| 13 | 5 | 40 | 700 | 0.68 | O | O |

EXAMPLE 4

Figure 1:
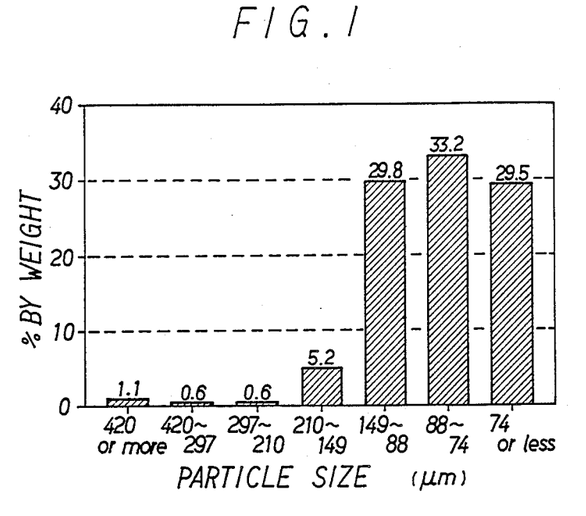
FIG. 1 is a graph showing the particle size distribution of the starting PFA powder used in Example 4.

A 2 l container of SUS containing 1 l of distilled water of 20° C. was charged with 2.4 g of an aqueous PTFE dispersion (solid content: 21% by weight, average particle size: 0.30 μm), 100 g of a finely divided PFA (MI: 5.3 g/10 min, TFE content:96.4% by weight, average particle size measured by using the Tyler Rotap shaker: 104 μm, particle size distribution: shown in FIG. (1) and 140 ml of tetrachlorodifluoroethane in this order. The mixture was agitated for 5 minutes at a speed of 500 r.p.m. by using the three-one motor. The agitation was then carried out for 2 minutes at a speed of 7,000 r.p.m. by using a Polytron dispersing machine (available from KINEMATICA GMBH) to divide large agglomerates. After that the aggromerate was recovered by filtration with a 100 mesh sieve of SUS, and dried at 290° C. for 1 hour to obtain a PFA granular powder (Experiment No. 14).

Properties of the granular powder and a film forming property of a sheet-like molded article are shown in Table 4.

In addition, the above agglomeration was carried out by scaling up to 20 l without changing the starting materials. Namely a 20 l container of SUS was charged with 20 l of distilled water. To the water were added 24 g of the aqueous PTFE dispersion, 1 kg of the PFA powder and 1 l of Dyflon Solvent S-2 (tetrachlorodifluoroethane available from Daikin Kogyo Co., Ltd.) in this order, and the mixture was agitated for 5 minutes at a speed of 150 r.p.m. by using a Chemi-stirrer (available from Tokyo Rika Kiki Kabushiki Kaisha). The agitation was then carried out for 2 minutes at a speed of 2,000 r.p.m. by using an Auto-homomixer (available from Tokushukika Kogyo Kabushiki Kaisha). After filtering and drying in the same manner as in Experiment No. 14, a PFA granular powder (Experiment No. 15) was obtained.

Properties of the granular powder and a film forming properties of a sheet-like molded article are shown in Table 4.

TABLE 4

Figure 2:
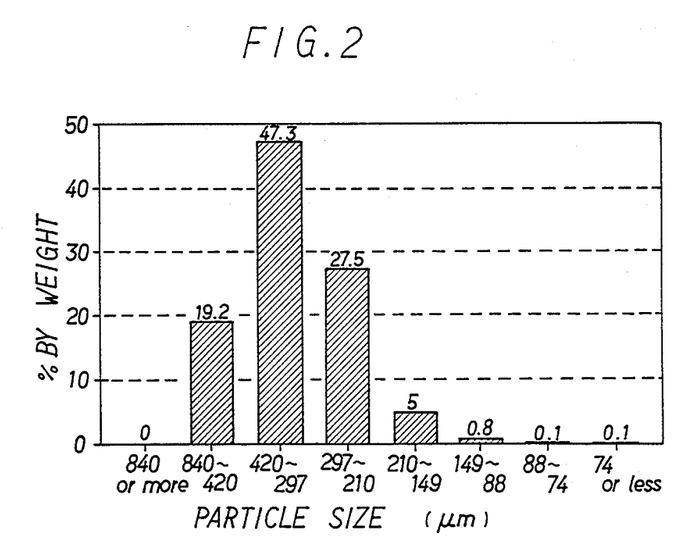
FIG. 2 is a graph showing the particle size distribution of the granular powder prepared in Experiment No. 14.
Figure 3:
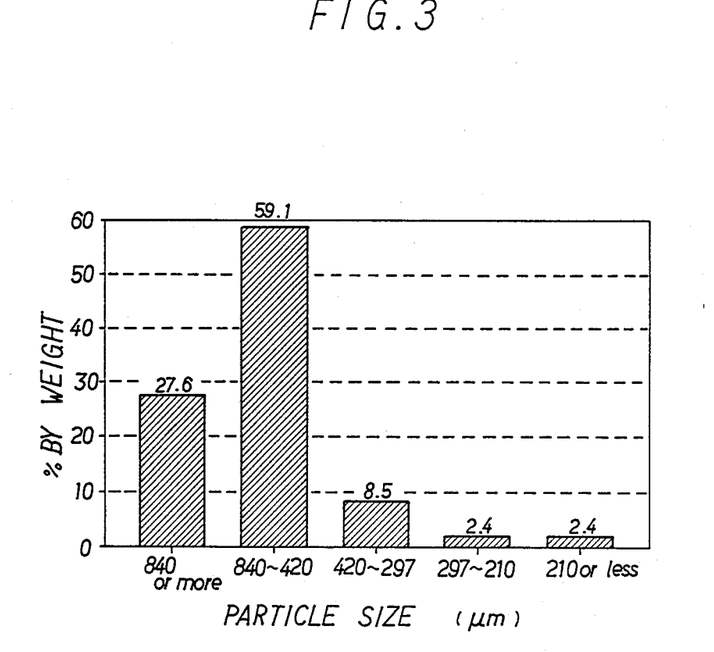
FIG. 3 is a graph showing the particle size distribution of the granular powder prepared in Experiment No. 15.

| Experiment No. | Particle size distribution | Properties of PFA granular powder | | |
|---|---|---|---|---|
| | | Bulk density (g/cm³) | Crushing resistance | Film forming property |
| 14 | Shown in FIG. 2 | 0.59 | O | O |
| 15 | Shown in FIG. 3 | 0.57 | O | O |

EXAMPLE 5

A PFA granular powder was prepared by agitating, agglomerating, filtering and drying in the same manner as in Experiment No. 14 of Example 4 except that 100 g of a finely devided PFA (MI: 11.4 g/10 min, TFE content 96.4% by weight average particle size: 195 μm) prepared by suspension polymerization was used as the MPFR, a colloidal aqueous PFA dispersion (solid content: 20% by weight, MI of polymer: 2.7 g/10 min, TFE content: 96.4% by weight, average particle size: 0.3 μm) was used in an amount (solid content to the PFA powder) shown in Table 5 as the TFE polymer, and 100 ml of tetrachlorodifluoroethane was used as the organic liquid.

Properties of the granular powder and a film forming property of a sheet-like molded article are shown in Table 5.

TABLE 5

| Experiment No. | Amount of colloidal aqueous PFA dispersion (PHR) | Agglomeration temperature (°C.) | Properties PFA granular powder | | | |
|---|---|---|---|---|---|---|
| | | | Ave. particle size (μm) | Bulk Density (g/cm³) | Crushing resistance | Film forming property |
| 16 | — | 40 | 300 | 0.48 | O | X |
| 17 | 25 | 40 | 240 | 0.64 | O | O |
| 18 | 50 | 40 | 150 | 0.78 | O | O |

EXAMPLE 6

1000 g of the same PFA powder as in Example 2 and 24 g (solid content: 5 g) of the same aqueous PTFE dispersion as in Example 2 were pre-mixed with 2 g of di-β-naphthyl-p-phenylenediamine, 1 g of zinc salt of 2-mercaptobenzoimidazole and 1 g of carbon black by means of a Henschel Mixer (available from Mitsui Miike Machinery Co., Ltd.) for 20 minutes at a rotation speed of 2,180 r.p.m.

To 1 l of distilled water of 40° C. contained in a 2 l container of SUS were added 100 g of the pre-mixture and 100 ml of tetrachlorodifluoroethane in this order, and agitated for 5 minutes with the three-one motor (rotation speed: 500 r.p.m.) and then 2 minutes with the Polytron dispersing machine (rotation speed: 7,000 r.p.m.). The obtained agglomerates were filtered with a 100 mesh sieve, and dried at 190° C. for 1 hour to give a PFA granular powder. The granular powder had an average particle size of 350 μm, a bulk density of 0.54 g/cm³, and a good crushing resistance.

The granular powder was sintered in the same manner as in Example 1 except that the sintering was carried out at 360° C. for 5 hours to produce a sheet-like molded article. The resulting PFA sheet had a good continuity and also no void.

Though a little amount of the thermal stabilizer was released into the water phase, an enough amount of the stabilizer was still remained in the granular powder.

EXAMPLE 7

A tetrafluoroethylene-ethylene copolymer (ETFE) granular powder was prepared in the same manner as in Experiment No. 14 of Example 4 except that a ETFE powder (MI (297° C.): 8.9 g/10 min, average particle size: 130 μm) obtained by classifying a ETFE prepared by suspension polymerization was used as the MPFR powder, and that 110 ml of tetrachlorodifluoroethane was used as the organic liquid, and that the drying after the agglomeration was carried out at 240° C. for 1 hour. Properties of the obtained granular powder are shown in Table 6.

The granular powder was filled in a frame (30 mm×50 mm×24 mm) placed on an aluminum plate so that a thickness of a sintered sheet was 1 mm, and sintered at 300° C. for 30 minutes. A film forming property of the resulting sheet-like molded article was measured. The results are shown in Table 6.

EXAMPLE 9

A 2 l container of SUS was charged with 500 g of an aqueous dispersion of TFE-FVE copolymer prepared by emulsion polymerization (solid content: 20.1%, average particle size: 0.17 μm, melt viscosity: 5.4×10⁴ poise), and then 4.8 g of an aqueous PTFE dispersion (solid content: 21%, average particle size of the polymer: 0.25 μm, molecular weight: 3,500,000) was added thereto. While agitating the mixture with the three-one motor (rotation speed: 200 r.p.m.), 5 ml of a 40% nitric acid was added to precipitate the mixture of the copolymer and the binder.

Subsequently, to the aqueous mixture were added 150 g of distilled water and 80 ml of trichlorotrifluoroethane as a lubricant. The resulting mixture was agitated for 5 minutes with the three-one motor at a rotation speed of 500 r.p.m. to agglomerate, and then agitated for 2 minutes with the Polytron dispersing machine at a rotation speed of 7,000 r.p.m. to divide. After repeating filtration and washing with water, the agglomerates were filtered with a 100 mesh sieve of SUS, and dried at 150° C. for 16 hours in an electric furnace.

The obtained granular powder had a bulk density of 0.73 g/cm³ and also had a good crushing resistance. The granular powder was placed on an iron plate (SS-41) so that a thickness of a sintered film was 2 mm, and then sintered at 320° C. for 30 minutes. The molded article had a good film forming property.

TABLE 6

| Experiment No. | Amount of PTFE powder (PHR) | Agglomeration temperature (°C.) | Properties ETFE granular powder | | | Film forming property |
|---|---|---|---|---|---|---|
| | | | Ave. particle size (μm) | Bulk Density (g/cm³) | Crushing resistance | |
| 19 | — | 40 | 330 | 0.46 | Δ | O |
| 20 | 5 | 40 | 280 | 0.50 | O | O |

EXAMPLE 8

To 1 l of distilled water of 40° C. in a 2 l container of SUS were added 17.5 g of the colloidal aqueous PFA dispersion used in Example 5 as the TFE polymer, 70 g of polyvinylidene fluoride (PVdF) powder (MI (230° C.): 9.2 g/10 min, average particle size measured by a photo extinction method: about 8 μm) as the MPFR powder and 40 ml of tetrachlorodifluoroethane as the organic liquid in this order. The mixture was agitated for 5 minutes with the three-one motor (rotation speed: 500 r.p.m.) and then for 2 minutes with the Polytron dispersing machine (rotation speed: 7,000 r.p.m.) to produce agglomerates. After filtering with a 200 mesh sieve of SUS, the agglomerates were dried at 150° C. for 1 hour to give a PVdF granular powder.

Properties of the granular powder and a film forming property of a sheet-like molded article prepared according to the same manner as in Example 7 are shown in Table 7.

As a comparative experiment, a granular powder was prepared in the same manner as described above except that the PTFE was not added. The obtained granular powder had a bulk density of 0.52 g/cm², but had a poor crushing resistance. A film forming property of a molded article prepared by sintering in the same manner as described above was not good.

EXAMPLE 10

A 50 l Henschel Mixer was charged with 30 kg of a fine powder of FEP prepared by suspension polymerization (melt viscosity: 46×10⁴ poise, average particle size measured by a photo extinction method: 12.5 μm), and then 12 kg of percrain and 1.5 kg of a PTFE powder for molding (Polyflon available from Daikin Kogyo Co., Ltd., average particle size: 25 μm) were added in this order. The mixture was agitated for 5 minutes at a rotation speed of 1460 r.p.m. with a standard blade, and dried at 50° C. for 16 hours in an electric furnace.

TABLE 7

| Experiment No. | Amount of colloidal aqueous PFA dispersion (PHR) | Agglomeration temperature (°C.) | Properties PVdF granular powder | | | Film forming property |
|---|---|---|---|---|---|---|
| | | | Ave. particle size (μm) | Bulk Density (g/cm³) | Crushing resistance | |
| 21 | — | 40 | — | 0.55 | X | O |
| 22 | 17.5 | 40 | 750 | 0.60 | O | O |

Properties of the obtained granular powder and a film forming property of a film sintered by using the powder are shown in Table 8 (as Experiment No. 23).

In addition, the results of a granular powder prepared without adding the PTFE powder are also shown in Table 8 (as Experiment No. 24).

TABLE 8

| Experiment No. | Properties of FEP granular powder | | Film forming property |
|---|---|---|---|
| | Bulk density (g/cm³) | Crushing resistance | |
| 23 | 0.64 | O | O |
| 24 | 0.48 | X | X |

What we claim is:

1. A granular powder of a melt processable fluorine-containing resin which is at least one member selected from the group consisting of a tetrafluoroethylene copolymer containing tetrafluoroethylene in an amount of not more than 97% by weight, a chlorotrifluoroethylene polymer and a vinylidene fluoride polymer, and is an agglomerate, comprising particles of the melt processable fluorine-containing resin having an average particle size of not more than 200 μm and a tetrafluoroethylene polymer as a binder, said agglomerate has an average particle size of not more than 1000 μm and a bulk density of not less than 0.3 g/cm³, and said tetrafluoroethylene polymer as a binder is at least one member selected from the group consisting of a tetrafluoroethylene homopolymer and a tetrafluoroethylene polymer modified by copolymerizing a tetrafluoroethylene with at least one monomer, in an amount of 0.001 to 2% by mole, selected from the group consisting of perfluoro alkyl vinyl ether, hexafluoropropylene, chlorotrifluoroethylene and vinylidene fluoride, and a weight ratio of the melt processable fluorine-containing resin to the tetrafluoroethylene polymer as a binder is 99.5/0.5 to 90.9/9.1.

2. The granular powder of claim 1, wherein the modified tetrafluoroethylene polymer as a binder is a tetrafluoroethylene polymer modified with perfluoro alkyl vinyl ether.

* * * * *